United States Patent [19]
Crone

[11] Patent Number: 6,109,562
[45] Date of Patent: Aug. 29, 2000

[54] AIRCRAFT CONSTRUCTION

[75] Inventor: James Crone, Kirkland, Canada

[73] Assignee: Pratt & Whitney Canada Corp., Longueuil, Canada

[21] Appl. No.: 09/063,926

[22] Filed: Apr. 22, 1998

[51] Int. Cl.[7] .................................. B64C 1/00; F01N 7/10
[52] U.S. Cl. .............................................. 244/119; 60/323
[58] Field of Search .................................... 244/17.11, 54, 244/129.4, 129.5, 119, 53 R, 110 B, 12.5; 60/272, 309, 323; 123/41.59

[56] References Cited

U.S. PATENT DOCUMENTS

| | | | |
|---|---|---|---|
| 2,231,239 | 2/1941 | Wright et al. | 244/53 R |
| 2,605,851 | 8/1952 | Gleason | 244/54 |
| 2,650,666 | 9/1953 | Dorand et al. | 244/17.11 |
| 2,653,585 | 9/1953 | Wallace | 123/41.59 |
| 3,517,898 | 6/1970 | LaVille et al. | 244/17.11 |
| 4,291,530 | 9/1981 | Ballard . | |
| 4,369,937 | 1/1983 | Lebell et al. . | |
| 4,388,804 | 6/1983 | Bushmeyer . | |
| 4,519,543 | 5/1985 | Szuminski et al. | 244/12.5 |
| 4,552,309 | 11/1985 | Szuminski et al. | 244/110 B |
| 5,372,338 | 12/1994 | Carlin et al. | 244/54 |

FOREIGN PATENT DOCUMENTS 2226441   1/1997   Canada .

OTHER PUBLICATIONS

John Fricker, Recent Soviet Rotary–Wing Revelations, Air International, Jan. 1990, p. 12, England.

Primary Examiner—Peter M. Poon
Assistant Examiner—Charles R. Ducker, Jr.
Attorney, Agent, or Firm—Jeffrey W. Astle

[57] ABSTRACT

An aircraft construction having an aircraft engine and an engine nacelle having a wall housing the engine. A cowl door is provided in the wall of the nacelle providing access to the engine to service it. An exhaust duct extends from the engine through the cowl door. The exhaust duct has a first duct section with an outlet end extending from the engine toward the cowl door with its outlet end adjacent the cowl door. The exhaust duct includes a second, separate duct section, having an inlet end, mounted in the cowl door and movable with the cowl door. The inlet end of the second duct section is located adjacent the outlet end of the first duct section, when the cowl door is closed, to have the first and second duct sections together directing exhaust from the engine out of the nacelle. When the cowl door is opened to service the engine, the second duct section moves away with the door making it easier to service the engine.

13 Claims, 4 Drawing Sheets

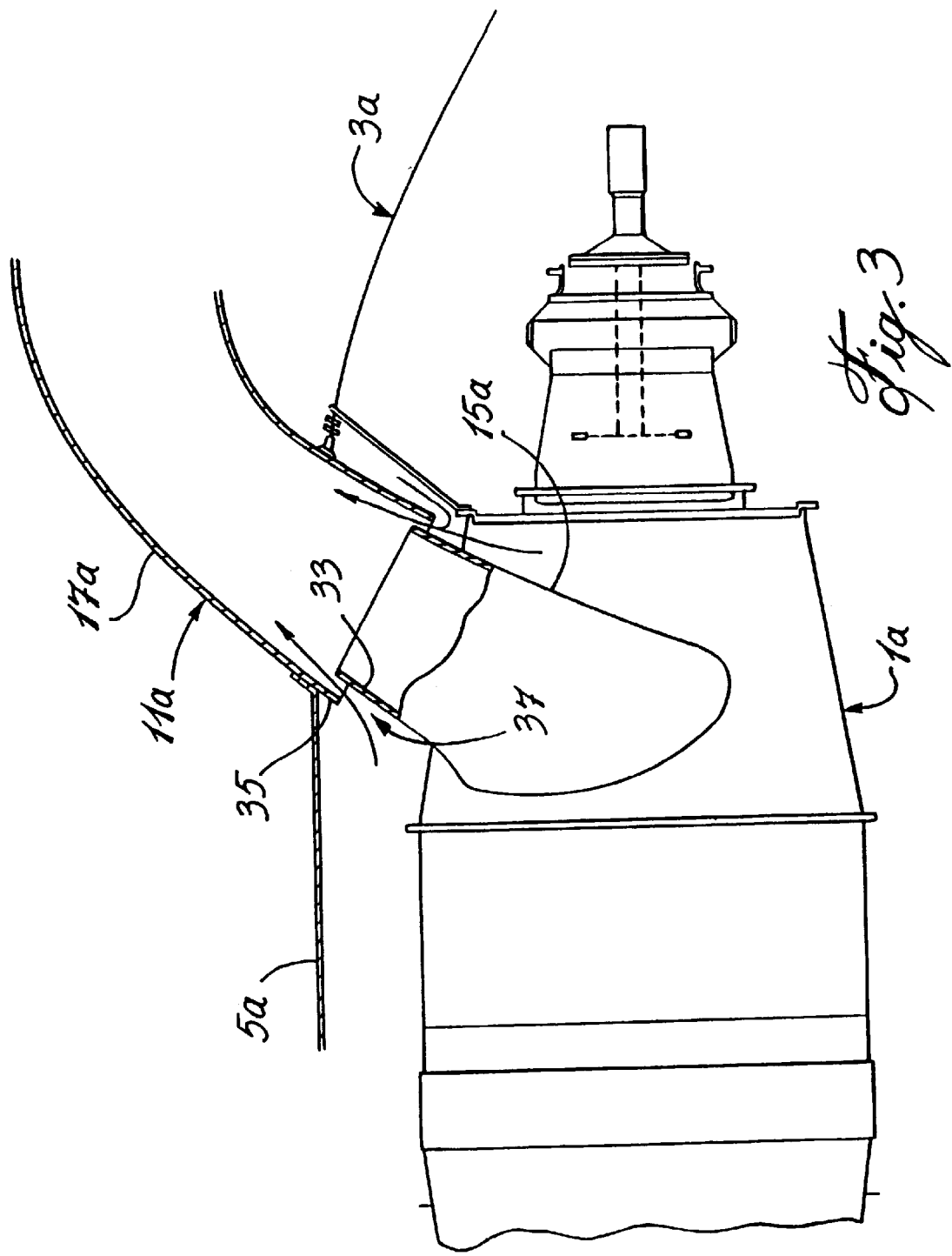

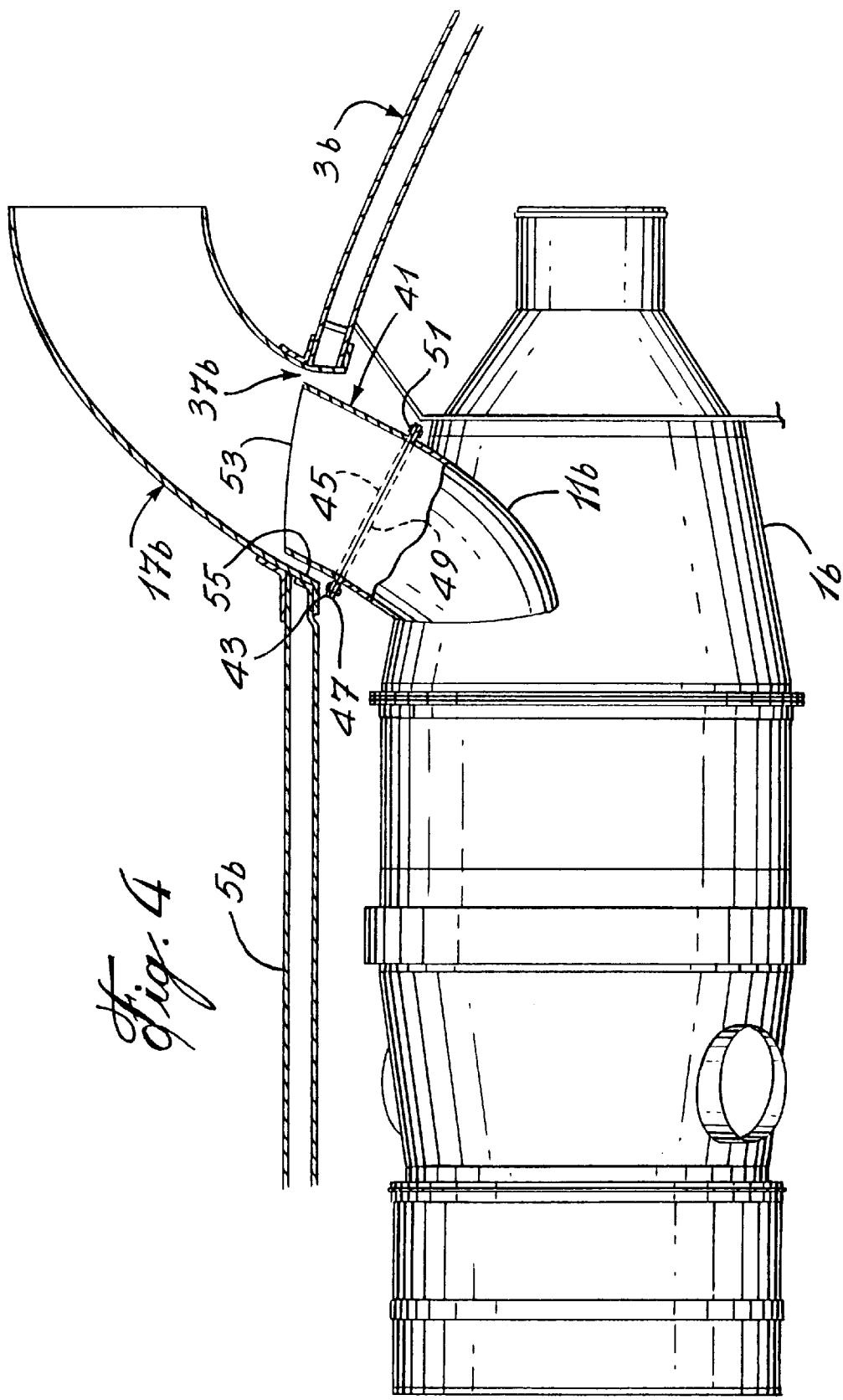

AIRCRAFT CONSTRUCTION

BACKGROUND OF THE INVENTION

1. Field of the Invention

This invention is directed toward an improved aircraft construction. The invention is particularly directed toward an improved aircraft construction for exhausting aircraft engines through engine nacelles.

2. Description of the Prior Art

Aircraft engines, particularly on certain models of helicopters, are presently exhausted to the rear and side of the engine, the exhaust duct from the engine passing through the wall of the nacelle while supported on the airframe within the nacelle. Often, the exhaust duct passes through the wall adjacent to the cowl door in the nacelle which door provides access to the engine so it can be serviced. Occasionally the exhaust duct even passes through one side of the door, the door being constructed to accommodate the duct while movable away from it to service the engine.

The exhaust duct, when located in the vicinity of the cowl door, makes servicing of the engine difficult. Even with the cowl door open, the duct hides a portion of the engine. Often, at least a portion of the exhaust duct has to be removed before the engine can be serviced, making servicing of the engine costly.

SUMMARY OF THE INVENTION

The purpose of the present invention is to provide an aircraft construction which construction automatically results in removal of part of the exhaust duct when the cowl door is opened to provide greater access to the engine. The construction includes mounting a portion of the exhaust duct on the cowl door in a position so that it moves out of the way when the cowl door is opened to service the aircraft engine. The portion of the exhaust duct on the cowl door is also designed to operatively connect with the remainder of the exhaust duct on the engine when the door is closed.

The improved aircraft construction also can be modified to permit better ventilation of the nacelle to allow the engine to run cooler thus increasing engine life. This is done by constructing the exhaust duct to incorporate an ejector where the movable and fixed parts of the exhaust duct meet when the cowl door is closed. The ejector withdraws heated air from the nacelle resulting in cooler air being drawn into the nacelle to help cool the engine. The ejector can incorporate an adapter mounted on the fixed exhaust duct section. The adapter can be changed to change the size of the ejector.

The invention is particularly directed toward an aircraft construction having an aircraft engine and a nacelle having a wall surrounding the engine. A cowl door in the wall of the nacelle provides access to the engine. An exhaust duct extends from the engine through the cowl door. The exhaust duct has a first duct section, with an outlet end, extending from the engine toward the door with its outlet end adjacent the cowl door; and a second, separate, duct section, with an inlet end, mounted in the cowl door, and movable with the door. The inlet end of the second duct section is adjacent the outlet end of the first duct section, when the cowl door is closed. The first and second duct sections together direct exhaust from the engine out of the nacelle when the cowl door is closed.

In one embodiment, the first and second duct sections abut to sealingly connect the sections together. In another embodiment, the first duct section can terminate in an outlet end that is smaller than the inlet end of the second duct section, the outlet end located within the inlet end of the second section and centered with respect to it to form an ejector slot drawing air from the nacelle into the second section of the duct and out of the nacelle. In yet another embodiment, an adapter can be mounted on the outlet end of the first duct section, the adapter fitting within the inlet end of the second duct section in a manner to form an ejector slot. The adapter is replaceable so that the size of the ejector slot can be varied.

The invention is also directed to an exhaust adapter for an aircraft, where aircraft includes an aircraft engine mounted within an engine nacelle having a wall housing the engine and a cowl door in the wall of the nacelle providing access to the engine to service it, and where the engine includes an exhaust duct with an outlet opening surrounded by a flange, the cowl door defining an opening coincident with the exhaust duct outlet, the exhaust adapter formed of a duct having a flange adapted to be mounted to the flange of the exhaust duct on the engine and the adapter projecting a short distance through the opening in the cowl door when the cowl door is closed.

BRIEF DESCRIPTION OF THE DRAWINGS

FIG. 3 is a top view, partly in section, showing the exhaust duct in two sections forming an ejector at their junction;

FIG. 4 is a top view, partly in section, showing the exhaust duct in two sections with an adapter interposed between the sections.

DESCRIPTION OF THE PREFERRED EMBODIMENTS

Figure 1:
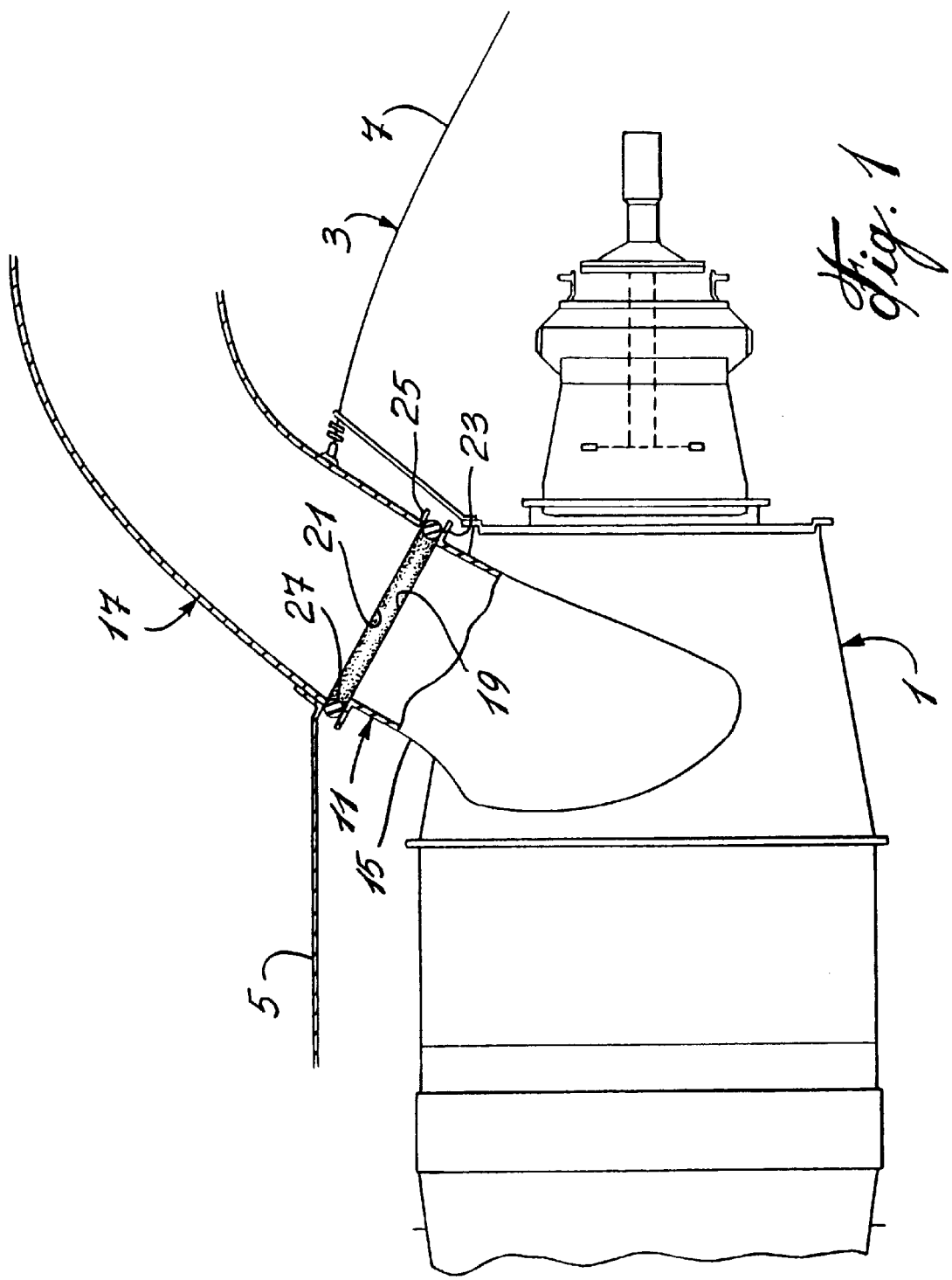
FIG. 1 is a top view of the aircraft construction, partly in section, showing the exhaust duct in two sections with the sections abutting.
Figure 2:
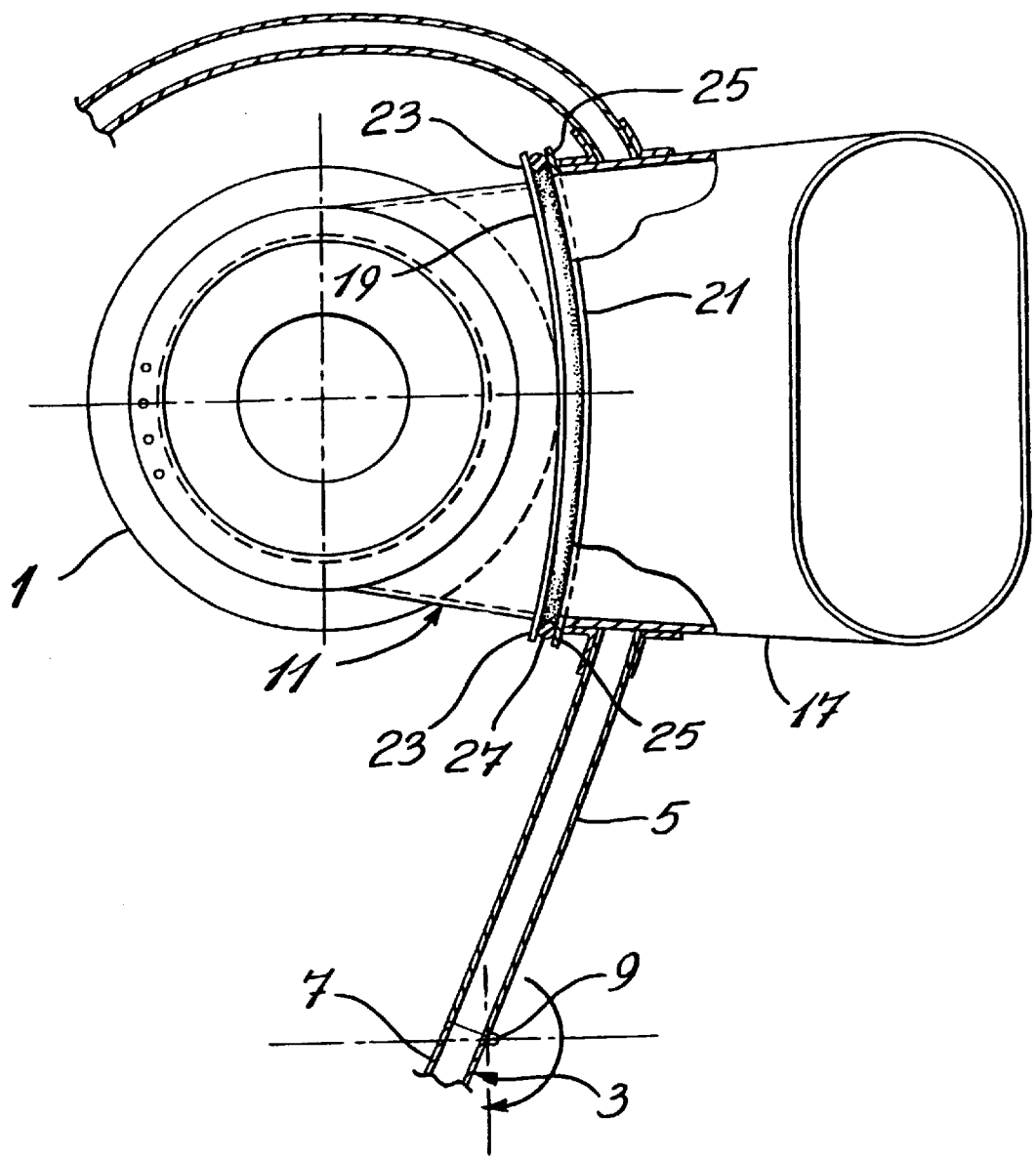
FIG. 2 is a rear view, partly in section, showing the two sections of the exhaust duct abutting.

The aircraft construction, as shown in FIGS. 1 and 2, has an aircraft engine 1 mounted within a nacelle 3. A cowl door 5 is provided in the wall 7 of the nacelle 3, the door 5 being hinged at the bottom by a hinge 9 to the wall 7.

An exhaust duct 11 extends rearwardly, and toward the side, from the engine 1 through the cowl door 5 to direct exhaust from the engine 1 outside the nacelle 3. The exhaust duct 11, in accordance with the present invention, is made in two sections. The first duct section 15 of the duct 11 is fixed to the engine 1 and leads rearwardly therefrom and toward the side toward the cowl door 5. The second duct section 17 of the duct 11 is mounted in the cowl door 5 and leads outside. The outlet end 19 of the first duct section 15, and the inlet end 21 of the second duct section 17 have flanges 23, 25 respectively thereon. A ring seal 27 is provided on flange 23 to abut the other flange 25 when the cowl door 5 is closed to form a complete, closed, exhaust duct 11 for directing exhaust from the engine 1 out of the nacelle 3. The ring seal 27 could be provided on the other flange 25 if desired.

When the engine is to be serviced, the cowl door 5 is opened and moved downwardly out of the way about hinge 9, taking the second duct section 17 of the exhaust duct 11 away with it. With a good portion of the exhaust duct 11 removed, servicing of the engine 1 is much easier. After servicing, the cowl door 5 is closed, and the inlet end 21 of the second duct section 17 abuts the seal 27 on the outlet end 19 of the first duct section 15 to form the complete, closed, exhaust duct 11.

If desired, the exhaust duct 11 can be modified to incorporate an ejector slot 37 for ejecting heated air out of the nacelle 3 while also getting rid of the engine exhaust. As shown in FIG. 3, the exhaust duct 11a is modified so the first duct section 15a has an outlet end portion 33 that is smaller than the inlet end portion 35 of the second duct section 17a. The outlet end portion 33 of the first duct section 15a fits concentrically within the inlet end portion 35 of the second duct section 17a and extends into the inlet end portion 35 for a short distance. The portion 33 may also be offset with respect to section 17a, rather than being purely concentric. An annular ejector slot 37 is formed at the junction of the two duct sections 15a, 17a. As the exhaust duct 11a exhausts exhaust from the engine 1a out of the nacelle 3a through the cowl door 5a, hot air from within the nacelle 3a is also drawn out through the ejector slot 37 and the exhaust duct 11a to cool the engine. As before, the second duct section 17a is moved out of the way when the cowl door 5a is opened to service the engine 1a.

If desired, the exhaust duct 11b can include an adapter 41 as shown in FIG. 4. The adapter 41 has a flange 43 on its inlet end 45 which is sized to abut a flange 47 on the outlet end 49 of the first duct section 11b. Suitable fasteners 51 detachably connect the flanges 43, 47 together to join the adapter 41 to the first duct section 11b. The outlet end 53 of the adapter 41 is sized to fit concentrically within the inlet end 55 of the second duct section 17b, or offset with respect to section 17b, and to extend part way into it, to form an annular ejector slot 37b. The exhaust from the engine 1b is directed out through the first duct section 11b, the adapter 41, and the second duct section 17b in series. At the same time, the ejector slot 37b ejects hot air from within the nacelle 3b. As before, opening the cowl door 5b moves the second duct section 17b out of the way to allow easier servicing of the engine 1b.

The adapter 41, being detachable, can be easily changed to use one of a number of adapters, each having a different size of outlet end 53 so as to be able to change the size the ejector slot 37b. If an ejector slot 37b is not required, the adapter 41 could be modified to mate with the inlet end 55 of the second duct section 17b, carrying a seal (not shown) on its outlet end 53 against which the inlet end 55 of the second duct section 17b would abut when the cowl door 5b is closed.

I claim:

1. An aircraft construction having: an aircraft engine; an engine nacelle having a wall housing the engine; a cowl door in the wall of the nacelle providing access to the engine to service it; an exhaust duct extending from the engine through the cowl door, the exhaust duct having a first duct section with an outlet end extending from the engine toward the cowl door with its outlet end adjacent the cowl door; and a second, separate duct section extending outboard of the nacelle and having an inlet end, mounted at the cowl door and movable with the cowl door; the inlet end of the second duct section adjacent the outlet end of the first duct section, when the cowl door is closed, to have the first and second duct sections together directing exhaust from the engine out of the nacelle.

2. An aircraft construction as claimed in claim 1 wherein the cowl door is hinged along its bottom edge to the wall, the cowl door carrying the second duct section away from the engine when the cowl door is opened to provide greater access to the engine when servicing the engine.

3. An aircraft construction as claimed in claim 2 wherein the outlet and inlet ends of the first and second duct sections respectively abut with a ring seal located between them, the ring seal mounted on one of the inlet and outlet duct ends.

4. An aircraft construction as claimed in claim 2 wherein the portion of the first duct section at its outlet end is slightly smaller than the portion of the second duct section at its inlet end, the outlet end of the first duct section mounted generally concentrically and slightly within the inlet end of the second duct section to form an annular ejector slot in the exhaust duct for exhausting air from within the nacelle along with exhaust from the engine when the cowl door is closed.

5. An aircraft construction as claimed in claim 2 wherein the exhaust duct includes an adapter mounted on the outlet end of the first duct section, the adapter having an outlet end that is smaller than the inlet end of the second duct section, the outlet end of the adapter fitting concentrically, and slightly within, the inlet end of the second duct section when the cowl door is closed to form an annular ejector slot in the exhaust duct for exhausting air from the nacelle.

6. An aircraft construction as claimed in claim 5 wherein the adapter is detachably connected to the first duct section so that the size of the ejector slot can be varied by changing the adapter.

7. An aircraft construction as claimed in claim 1 wherein the outlet and inlet ends of the first and second duct sections respectively abut with a ring seal located between them, the ring seal mounted on one of the inlet and outlet duct ends.

8. An aircraft construction as claimed in claim 1 wherein the portion of the first duct section at its outlet end is slightly smaller than the portion of the second duct section at its inlet end, the outlet end of the first duct section mounted generally concentrically and slightly within the inlet end of the second duct section to form an annular ejector slot in the exhaust duct for exhausting air from within the nacelle along with exhaust from the engine when the cowl door is closed.

9. An aircraft construction as claimed in claim 1 wherein the exhaust duct includes an adapter mounted on the outlet end of the first duct section, the adapter having an outlet end that is smaller than the inlet end of the second duct section, the outlet end of the adapter fitting generally concentrically, and slightly within, the inlet end of the second duct section when the cowl door is closed to form an annular ejector slot in the exhaust duct for exhausting air from the nacelle.

10. An aircraft construction as claimed in claim 9 wherein the adapter is detachably connected to the first duct section so that the size of the ejector slot can be varied by changing the adapter.

11. An aircraft construction as defined in claim 1 wherein the engine nacelle forms part of a helicopter fuselage.

12. An aircraft construction as defined in claim 1, wherein the engine nacelle forms part of a tilt rotor fuselage.

13. An exhaust adapter for an aircraft, the aircraft including an aircraft engine mounted within an engine nacelle having a wall housing the engine and a cowl door in the wall of the nacelle providing access to the engine to service it, the engine including a first exhaust duct section having an outlet opening surrounded by a flange within the nacelle wall, the cowl door defining an opening with a second exhaust duct section mounted to the cowl door and extending outboard of the cowl door and encompassing the opening, the exhaust adapter formed of a duct having a flange adapted to be mounted to the flange of the first exhaust duct section on the engine and the adapter projecting a short distance through the opening in the cowl door into and concentric with the second duct section when the cowl door is closed.

* * * * *